(12) United States Patent
Joshi

(10) Patent No.: US 9,167,012 B2
(45) Date of Patent: Oct. 20, 2015

(54) METHOD AND APPARATUS FOR SHARING MEDIA UPON REQUEST VIA SOCIAL NETWORKS

(71) Applicant: Nokia Corporation, Espoo (FI)

(72) Inventor: Dhaval Jitendra Joshi, Bangalore (IN)

(73) Assignee: NOKIA CORPORATION, Espoo (FI)

( * ) Notice: Subject to any disclaimer, the term of this patent is extended or adjusted under 35 U.S.C. 154(b) by 349 days.

(21) Appl. No.: 13/721,914

(22) Filed: Dec. 20, 2012

(65) Prior Publication Data

US 2013/0166651 A1 Jun. 27, 2013

(30) Foreign Application Priority Data

Dec. 22, 2011 (IN) .......................... 4509/CHE/2011

(51) Int. Cl.
*G06F 15/16* (2006.01)
*H04L 29/06* (2006.01)
*G06Q 50/00* (2012.01)

(52) U.S. Cl.
CPC .............. *H04L 65/403* (2013.01); *G06Q 50/01* (2013.01); *H04L 65/4015* (2013.01)

(58) Field of Classification Search
CPC .. G06Q 50/01; G06F 17/30241; H04L 51/32; H04L 67/22; H04L 51/26
USPC .................................. 709/204, 205, 206, 207
See application file for complete search history.

(56) References Cited

U.S. PATENT DOCUMENTS

| | | | |
|---|---|---|---|
| 8,655,938 B1 * | 2/2014 | Smith et al. .................... | 709/200 |
| 8,676,875 B1 * | 3/2014 | Smith et al. .................... | 709/200 |
| 2009/0148124 A1 | 6/2009 | Athsani et al. | |
| 2012/0215597 A1 * | 8/2012 | Ross ............................. | 705/14.1 |

FOREIGN PATENT DOCUMENTS

WO 2009/027818 A3 3/2009

OTHER PUBLICATIONS

Twitxr, Product page [online]. FON Labs <URL: http://web.archive.org/web/20090122102329/http://twitxr.com/?>, dated Jan. 22, 2009, retrieved on Jan. 20, 2015, pp. 1.*
Twitxr iOS iPhone, <URL: http://appshopper.com/social-networking/twitxr>, dated Aug. 3, 2009, retrieved on Jan. 20, 2015, pp. 1-2.*
Twitxr, Product web page [online]. FON Labs, Retrieved from the Internet: <URL: http://web.archive.org/web/*/http://www.twitxr.com/>, dated Dec. 15, 2011, Retrieved on Jul. 10, 2013, pp. 1.
Facebook, Dictionary entry [online], Wikipedia.org, dated Dec. 12, 2011, retrieved on Jul. 10, 2013, Retrieved from the Internet: <URL: http://en.wikipeia.org/wiki/Facebook> section "Website" on pp. 1-16.
International Search Report for related International Patent Application No. PCT/FI2012/051235 dated Jul. 12, 2013, 4 pages.
International Written Opinion for related International Patent Application No. PCT/FI2012/051235 dated Jul. 12, 2013, 8 pages.
Twitxr, "Frequently Asked Questions", Retrieved from the Internet: <URL: http://web.archive.org/web/20111124024423/http://www.twitxr.com/help>, dated Nov. 24, 2011, retrieved Oct. 7, 2013, pp. 1-2.

* cited by examiner

*Primary Examiner* — Liangche A Wang
(74) *Attorney, Agent, or Firm* — Ditthavong & Steiner, P.C.

(57) ABSTRACT

An approach is provided for determining requests for media and responding in substantially real-time utilizing a single user interface. The social network client determines one or more requests from one or more requesting users to capture media related to at least one social networking status of one or more sharing users. The social network client then causes, at least in part, an indication of the one or more requests to the one or more sharing users related to the at least one social networking status.

18 Claims, 8 Drawing Sheets

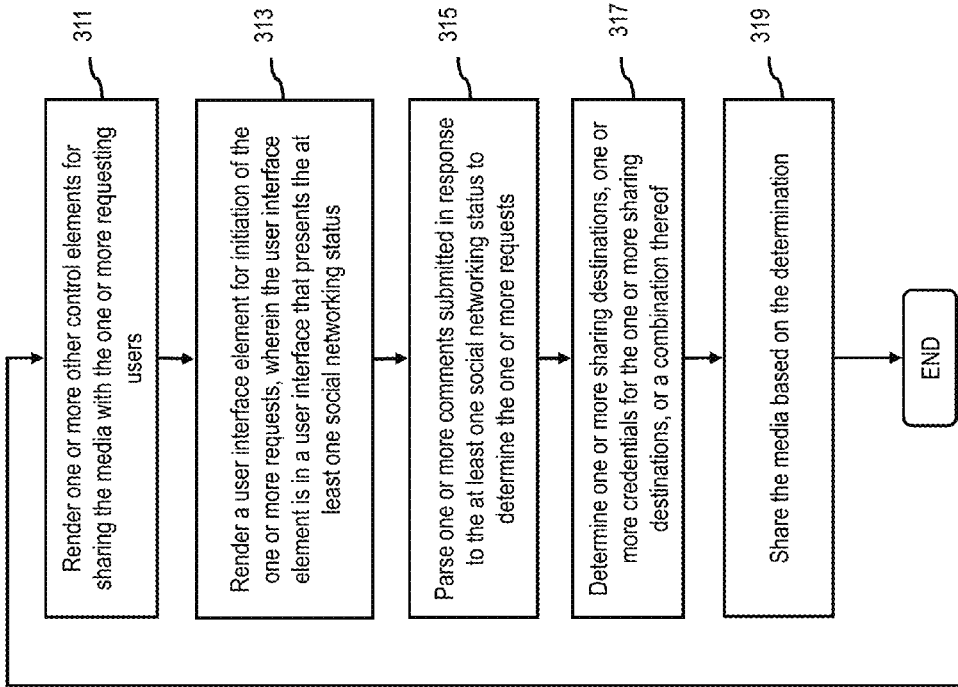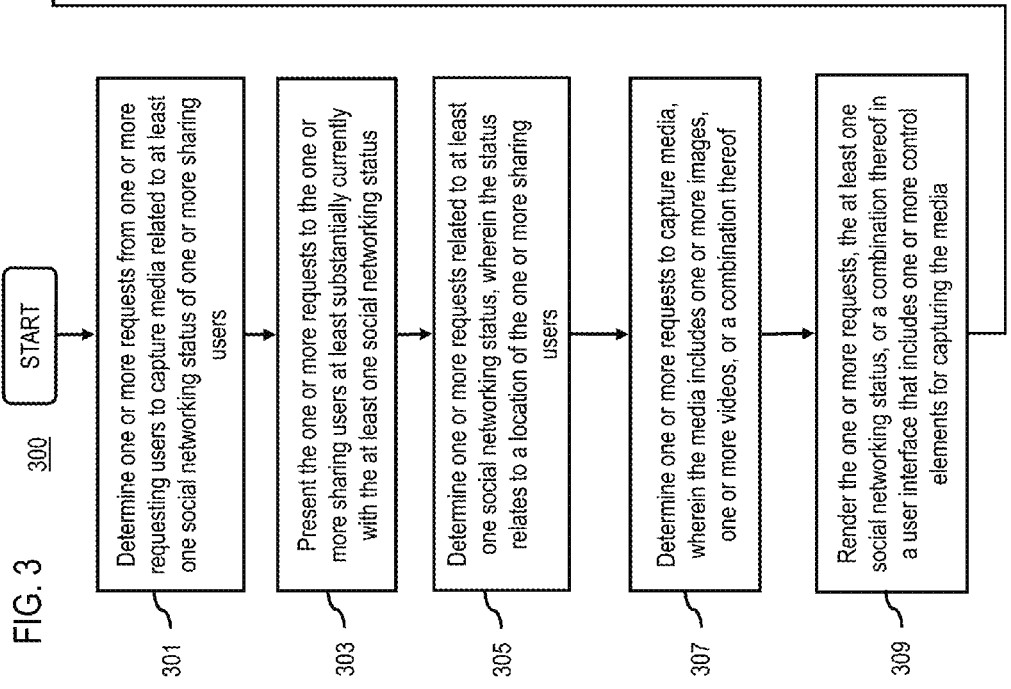

METHOD AND APPARATUS FOR SHARING MEDIA UPON REQUEST VIA SOCIAL NETWORKS

RELATED APPLICATIONS

This application claims the benefit of the earlier filing date under 35 U.S.C. §119(a) of Indian Application No. 4509/CHE/2011 filed Dec. 22, 2011, entitled "Sharing Media Upon Request via Social Networks," the entirety of which is incorporated herein by reference.

BACKGROUND

Service providers and device manufacturers (e.g., wireless, cellular, etc.) are continually challenged to deliver value and convenience to consumers by, for example, providing compelling network services. One area of interest has been the development of social networking services (e.g., FACEBOOK, TWITTER, etc.) that allow users to share photographs, videos, and/or music with their friends, family, and/or associates. Service providers and device manufactures have recently made considerable inroads in the development of services and applications that allow users of mobile devices (e.g., mobile phones) to share media with their friends, family, and/or associates on-the-go and in substantially real-time. However, because users are often required to switch back and forth between an application used for capturing media and an application used for sharing media, many users share their media in retrospect (i.e., after some time has passed since capturing the media). As a result, users can only guess whether others will like their shared media. Accordingly, many users find the experience of sharing media tedious and therefore lose interest in the process.

SOME EXAMPLE EMBODIMENTS

Therefore, there is a need for an approach for determining requests for media and responding in substantially real-time utilizing a single user interface.

According to one embodiment, a method comprises determining one or more requests from one or more requesting users to capture media related to at least one social networking status of one or more sharing users. The method also comprises causing, at least in part, an indication of the one or more requests to the one or more sharing users related to the at least one social networking status.

According to another embodiment, an apparatus comprises at least one processor, and at least one memory including computer program code for one or more computer programs, the at least one memory and the computer program code configured to, with the at least one processor, cause, at least in part, the apparatus to determine one or more requests from one or more requesting users to capture media related to at least one social networking status of one or more sharing users. The apparatus is also caused to cause, at least in part, an indication of the one or more requests to the one or more sharing users related to the at least one social networking status.

According to another embodiment, a computer-readable storage medium carries one or more sequences of one or more instructions which, when executed by one or more processors, cause, at least in part, an apparatus to determine one or more requests from one or more requesting users to capture media related to at least one social networking status of one or more sharing users. The apparatus is also caused to cause, at least in part, an indication of the one or more requests to the one or more sharing users related to the at least one social networking status.

According to another embodiment, an apparatus comprises means for determining one or more requests from one or more requesting users to capture media related to at least one social networking status of one or more sharing users. The apparatus also comprises means for causing, at least in part, an indication of the one or more requests to the one or more sharing users related to the at least one social networking status.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-15.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3 and 4 are flowcharts of processes for determining requests for media and responding in substantially real-time utilizing a single user interface, according to one embodiment;

DESCRIPTION OF SOME EMBODIMENTS

Examples of a method, apparatus, and computer program for determining requests for media and responding in substantially real-time utilizing a single user interface are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
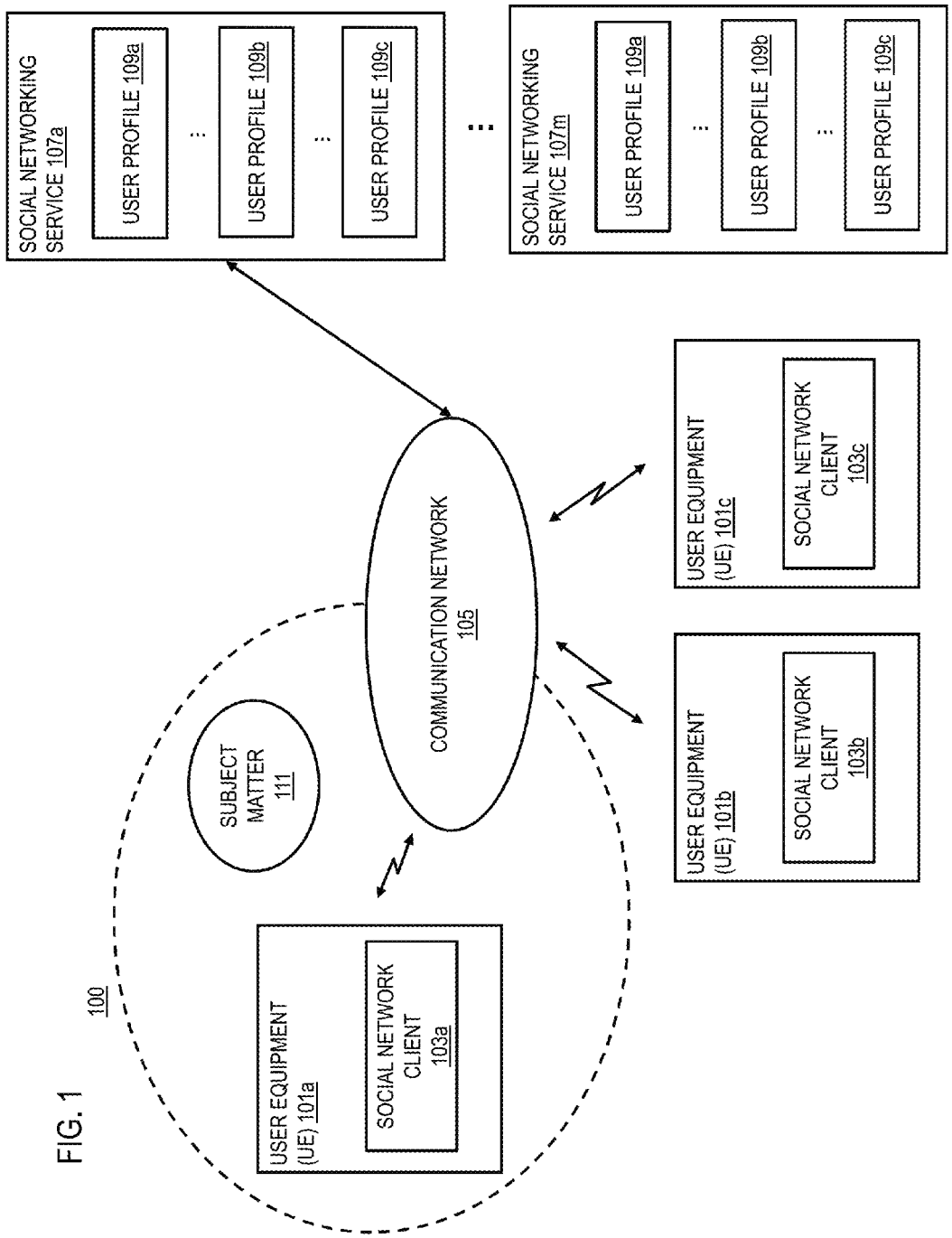
FIG. 1 is a diagram of a system capable of determining requests for media and responding in substantially real-time utilizing a single user interface, according to one embodiment.

FIG. 1 is a diagram of a system capable of determining requests for media and responding in substantially real-time utilizing a single user interface, according to one embodiment. Although service providers and device manufacturers have made considerable inroads in the development of social networking services to make users feel more "connected" with one another, many users still share media (e.g., photos and video) in retrospect (i.e., after some time has passed since capturing the media). One of the main reasons for this delay is that users of mobile devices (e.g., mobile phones) are often required to switch back and forth between an application used for capturing media (e.g., a photograph) and an application used sharing the captured media (e.g., FACEBOOK, TWITTER, etc.), which for some can be tedious. As a consequence of this delay, users in the context of capturing media can only guess how their friends, family, and/or associates will perceive their shared media (e.g., like, comment, etc.). Moreover, because users often share the media after they have left the original context, the users are unable to obtain assistance and/or guidance from their friends, family, and/or associates regarding a useful way to capture the media (e.g., a particular frame or angle).

To address this problem, a system 100 of FIG. 1 introduces the capability to determine requests and share responsive media in substantially real-time utilizing a single user interface. In one embodiment, the system 100 causes the sharing of at least one social networking status (e.g., "@ the Great Wall of China for 30 minutes") associated with one or more sharing users via one or more social networking services (e.g., FACEBOOK, TWITTER, etc.) based, at least in part, on the credentials (e.g., login and password) of the one or more sharing users. By way of example, once one or more friends, family, and/or associates connected with the one or more sharing users on the one or more social networking services (also collectively referred as the requesting users) notice the social networking status (e.g., "@ the Great Wall of China for 30 minutes") of the one or more sharing users, the one or more requesting users can utilize the system 100 to request media (e.g., images, video, etc.) based on the location of the one or more sharing users as indicated by his or her social networking status. More specifically, the system 100 renders a user interface element for initiating the one or more requests for media in a user interface of a mobile device (e.g., a mobile phone) that also contains the at least one social networking status of the one or more sharing users. In one embodiment, the system 100 determines one or more requests for media for approximately 45 minutes after the one or more sharing users share at least one social networking status based, at least in part, on the likelihood that the one or more sharing users would no longer be in the shared location after this period of time. In addition, the system 100 can be utilized in connection with events as well as locations (e.g., the Olympics, the World Cup, the Great China trade fair, the G20 Summit, etc.).

In one embodiment, the system 100 causes a rendering of the one or more requests (e.g., five requests) from the one or more requesting users (e.g., five requesting users) in a user interface of a mobile device (e.g., a mobile phone) related to the at least one social networking status of the user (i.e., while the social networking status is active and/or current) and one or more control elements for capturing the media (e.g., a camera icon). By way of example, the system 100 can determine the one or more requests from the one or more requesting users based on explicit instructions (e.g., "Take a photograph of the Great Wall") and/or implicit instructions (e.g., utilizing a "Take photo" icon). The system 100 can also process and then present the one or more requests for media to one or more sharing users based on a grouping, a categorization, or a combination thereof. For example, the system 100 can process and present to the one or more sharing users one request for media related to the Great Wall of China and one request for media related to tourists visiting the Great Wall of China as a single request so that the one or more sharing users can fulfill both requests with one shared media (e.g., a photograph of tourists visiting the Great Wall). In addition, the system 100 can also prioritize the one or more requests based on the nature of the relationship between the one or more sharing users and the one or more requesting users (e.g., requests from family members can receive priority over requests from associates).

In one embodiment, the system 100 can also determine to distribute the one or more requests among one or more sharing users based on the context of the one or more sharing users. By way of example, if a social networking group (e.g., a High School Band) as a whole shares a group social networking status (e.g., "@ the Great Wall of China for 30 minutes") or if only one member of a group posts an individual social networking status, but the system 100 determines based on his or her user profile that the member is traveling with a group, the system 100 can determine which member of the group is best able to capture the requested media (e.g., closest to the subject matter). In one example, the system 100 can also determine to re-distribute one or more requests for media among the group if, for example, one or more sharing users have already received a larger number of requests for media. In another example, the system 100 can determine from a user profile of the one or more sharing users that a particular user is proficient at capturing media in a specific manner (e.g., landscape). The system 100 can then assign one or more requests for landscape media to that particular sharing user within the group.

In one embodiment, the system 100 can present to one or more sharing users guidance as to how to best capture the requested media. By way of example, the system 100 can present to the one or more sharing users example media related to one or more requests (e.g., "Take a photo of the Great Wall of China") in a user interface of a mobile device in order to suggest or recommend a useful viewpoint, frame, subject matter (e.g., a battlement), or a combination thereof to best capture the requested media. More specifically, the system 100 determines the one or more example media based on the one or more requests (e.g., "Take a photo of the Great Wall of China"), one or more social networking statuses (e.g., "@ the Great Wall of China for 30 minutes"), the context of the one or more sharing users (e.g., 8:00 a.m.), or a combination thereof. The system 100 can also determine the one or more example media based on the media previously captured and shared by the one or more requesting users, the location of the one or more sharing users, the context of the one or more sharing users, or a combination thereof. Moreover, the system 100 can also determine the one or more example media from the public at large (e.g., by scanning metadata on the Internet).

In one embodiment, the system 100 captures media related to the one or more requests and then transmits and/or shares the media with the one or more requesting users in substantially real-time via one or more social networking services. In particular, the system 100 captures and shares the requested media without requiring a user to switch back and forth between an application for capturing media and an application for sharing media. In addition, the system 100 can be used to share the requested media with one or more requesting users individually or globally (e.g., posting the media on a public user profile). Once the system 100 shares the captured media via one or more social networking services, the one or more requesting users and/or additional friends, family, and/or associates connected with the one or more sharing users can make comments related to the shared media and in some instances may even request additional media (e.g., "take a picture inside the battlement").

As shown in FIG. 1, the system 100 comprises one or more user equipment (UE) 101a-101c (also collectively referred to as UEs 101) containing one or more social network clients 103a-103c (e.g., a social network service application) (also collectively referred to as social network clients 103) having connectivity to one or more social networking services 107a-107m (e.g., FACEBOOK, TWITTER, etc.) (also collectively referred to as social networking services 107) via a communication network 105. The social networking services 107 also contain one or more user profiles 109a-109c (also collectively referred to as user profiles 109), which represent the user profiles associated with the one or more users of the one or more UEs 101.

In one embodiment, the system 100 has been simplified to include three UEs 101 (e.g., UE 101a-101c); one UE 101 (e.g., UE 101a) is utilized to receive requests for media relating to a subject matter 111 and to capture and share such media in substantially real-time and two UEs 101 (e.g., UE 101b and UE 101c) are utilized to request and receive the shared media. However, it is contemplated that any number of UEs 101 can be utilized in requesting, capturing, and/or receiving media.

In one embodiment, the social network client 103a of the UE 101a (e.g., a mobile phone) transmits the social networking status of a user of the UE 101a to the social networking services 107 (e.g., FACEBOOK) via the communication network 105. More specifically, the social network client 103a transmits the social networking status of the user of the UE 101a and one or more credentials (e.g., login and password) associated with the user and the social networking services 107. The social network clients 103 associated with the UEs 101 of one or more friends, family, and/or associates connected with the user of the UE 101a on the social networking services 107 (e.g., the social network client 103b of the UE 101b and the social network client 103c of the UE 101c) receive a notification of the social networking status of the user of the UE 101a (e.g., "@ the Great Wall of China for 30 minutes"). In this instance, the one or more friends, family, and/or associates of the sharing user (also collectively referred to as the requesting users) may have previously visited the Great Wall of China and/or want to know what it looks like. As a result, the social network clients 103 can be used by the one or more requesting users to transmit one or more requests for media (e.g., "Take a picture of the Great Wall") related to the at least one social networking status of one or more sharing users (i.e., while the at least one social networking status is active and/or current).

In one embodiment, the social network client 103a first groups, categorizes, or a combination thereof one or more requests for media. By way of example, the social network client 103a can determine that one or more requests for media related to the Great Wall of China and one or more requests for media related to the tourists visiting the Great Wall of China can be combined into one request for media. In addition, the social network client 103a can also prioritize the one or more requests for media based on the relationship between the one or more sharing users and the one or more requesting users as detailed within the user profiles 109 associated with the one or more sharing users and the one or more requesting users. By way of example, the social network client 103a can determine that one request for media comes from the spouse of the sharing user and another request for media comes from a colleague of the sharing user. In this instance, the social network client 103a can determine to assign priority to the request for media transmitted from the sharing user's spouse as opposed to the request for media from the sharing user's colleague.

In one embodiment, the social network client 103a renders the two requests in a user interface associated with the UE 101a along with the social networking status of the user (e.g., "@ the Great Wall of China for 30 minutes" and "2 photo requests"). The social network client 103a then also renders one or more control elements for capturing the media (e.g., a camera icon). In the instance where the one or more sharing users are uncertain as to how to best capture the requested media, the social network clients 103 may also be used to present one or more examples of related media in the user interface of the UEs 101. More specifically, the social network clients 103 can determine the example media based on the one or more requests for media (e.g., "take a picture of the Great Wall"), the social networking status of the one or more sharing users (e.g., "@ the Great Wall of China for 30 minutes"), the context of the sharing user (e.g., "8:00 a.m. @ the Great Wall of China for 30 minutes"), or a combination thereof. By way of example, the example media determined by the social network clients 103 may be based on a recommended viewpoint, a recommended frame, a recommended subject, or a combination thereof. In addition, the social network clients 103 may determine the example media from the one or more requesting users, one or more other friends, family, and/or associates connected with the one or more sharing users via the social networking services 107, the public at large via the Internet, or a combination thereof In one embodiment, a social network client 103 is used to capture one or more media (e.g., a photograph) relating to the one or more requests for media. The social network client 103 then renders one or more control elements for sharing the captured media with the one or more requesting users specifically and/or the social networking services 107 generally (e.g., posting the media on a user profile 109). By way of example, once the social network client 103a transmits and/or posts the requested media on the social networking services 107, the requesting users can use the social network clients 101b and/or 101c to make a comment about the one or more shared media and/or request additional media (e.g., "take a picture inside one of the battlements").

In one embodiment, the social network client 103 can distribute one or more requests among one or more sharing users based on context information associated with the one or more sharing users. For example, if a social networking group (e.g., a High School Band) as a whole has shared a group social networking status (e.g., "@ the Great Wall of China for 30 minutes") or if only one member of a group posts an individual social networking status, but the social network client 103 can determine from his or her user profile 109 that the member is traveling with a group, the social network client 103 can determine which member of the group is best able to capture the requested media (e.g., closest to the subject matter). In one example, the social network client 103 can also determine to re-distribute one or more requests for media among the group if, for example, one or more sharing users have already received a large number of requests for media. In another example, the social network client 103 can determine from a user profile 109 of the one or more sharing users that a particular user is proficient at capturing media in a specific manner (e.g., landscape). The social network client 103 can then assign one or more requests for landscape media to that particular sharing user within the group.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UEs 101 and the social networking services 107 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
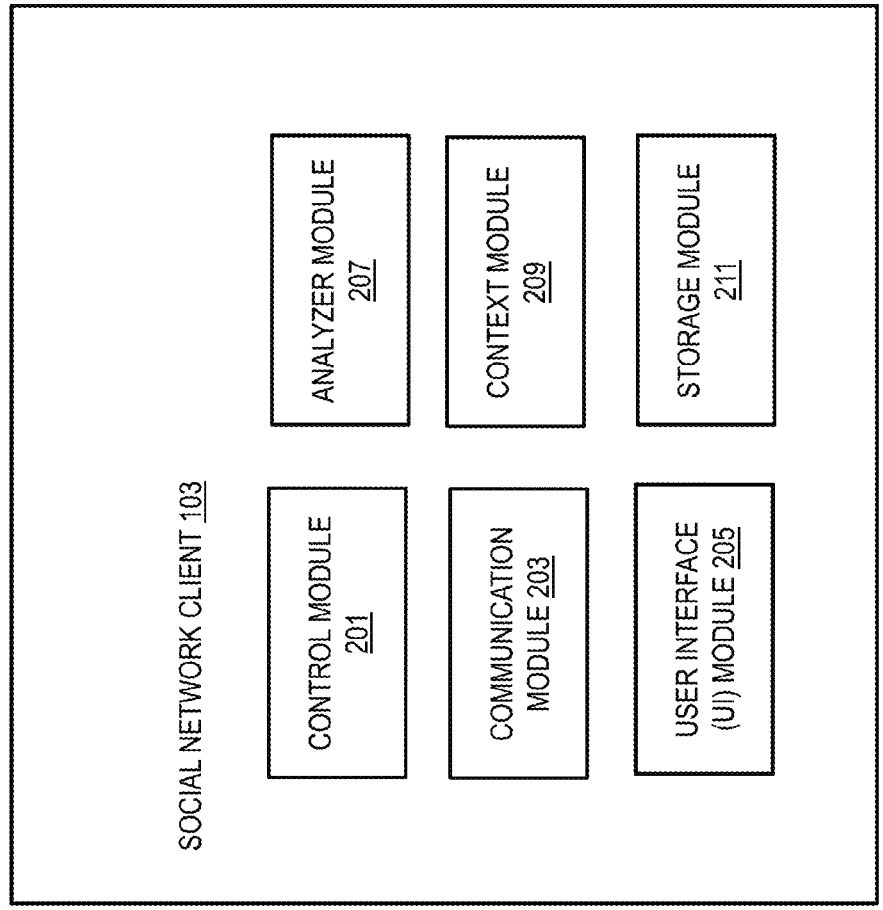
FIG. 2 is a diagram of the components of a social network client, according to one embodiment.

FIG. 2 is a diagram of the components of the social network client 103, according to one embodiment. By way of example, the social network client 103 includes one or more components for determining requests for media and responding in substantially real-time utilizing a single user interface. It is contemplated that the functions of these components may be combined in one or more components or performed by other components of equivalent functionality. In this embodiment, the social network client 103 includes a control module 201, a communication module 203, a user interface (UI) module 205, an analyzer module 207, a context module 209, and a storage module 211.

The control module 201 executes at least one algorithm for executing functions of the social network client 103. For example, the control module 201 may execute an algorithm for processing a query associated with the UEs 101 (e.g., the UE 101b and/or UE 101c) for media related to at least one social networking status associated with the UEs 101 (e.g., the UE 101a). By way of another example, the control module 201 may execute an algorithm to interact with the communication module 203 to communicate among the social network clients 103, the social networking services 107, and the user profiles 109. The control module 201 may also execute an algorithm to interact with the user interface module 205 to render one or more requests for media from one or more friends, family, and/or associates via the social networking services 107. The control module 201 also may execute an algorithm to interact with the analyzer module 207 to analyze one or more requests, one or more example media, and/or one or more social relationships among one or more requesting users, one or more sharing users, or a combination thereof. The control module 201 may also execute an algorithm to interact with the context module 209 to determine the context or situation of the UEs 101 (e.g., the UE 101a). In addition, the control module 201 also may execute an algorithm to interact with the storage module 211 to temporarily store example media that can be used by the one or more sharing users for guidance for capturing the requested media.

The communication module 203 is used for communication between the social network clients 103, the social networking services 107, and the user profiles 109. The communication module 203 may be used to communicate commands, requests, data, etc. By way of example, the communication module 203 may be used to transmit one or more requests to capture media from one or more UEs 101 (e.g., the UE 101b and/or the UE 101c) to one or more other UEs 101 (e.g., the UE 101a) via one or more social networking services 107 related to the at least one social networking status (e.g., "@ the Great Wall of China for 30 minutes") associated with the one or more other UEs 101 (e.g., the UE 101a). In one embodiment, the communication module 203, in connection with the user interface (UI) module 205, is used to transmit one or more credentials (e.g., login and password) for the one or more user profiles 109 of the one or more social networking services 107. By way of example, the communication module 203 may temporarily store the login and password associated with the one or more social networking services 107 in the storage module 211 so that the user is not required each time to re-enter and re-transmit the one or more credentials. In one embodiment, the communication module 203, in connection with the user interface module 205 and the storage module 211, is used to present to a sharing user example media as guidance for capturing the requested media.

The user interface (UI) module 205 is used to present to one or more sharing users one or more requests to capture media from one or more of requesting users. More specifically, the user interface module 205 is used to render a user interface element for causing an initiation of the one or more request to capture media (e.g., a "Take photo" icon) in a user interface that also includes at least one social networking status of friends, family, and/or associates connected to the user of the UE 101 via one or more social networking services 107. The user interface module 205 is also used to render the one or more requests for media based on at least one social networking status of one or more sharing users in a user interface that also includes one or more control elements for capturing media (e.g., a camera icon). In addition, the user interface module 205 is further used to render one or more control elements in the same user interface for sharing the requested media with the one or more requesting users (e.g., an envelope icon). In one embodiment, the user interface module 205 can also be used, in connection with communication module 203 and the storage module 211, to present to the one or more sharing users example media as guidance for capturing the requested media. More specifically, the user interface module 205 presents the example media in the same user interface that includes the one or more control elements for capturing media, the one or more control elements for requesting media, and the one or more control elements for sharing media. In one embodiment, the user interface module 205 can also be used to determine one or more credentials (e.g., login and password) for the one or more social networking services 107 (e.g., FACEBOOK).

The analyzer module 207 is used to parse the one or more comments submitted by one or more requesting users in response to the at least one social networking status of one or more sharing users. More specifically, the analyzer module 207 can be used to determine explicit requests (e.g., "take a picture") or implicit requests (e.g., utilizing a "Take photo" icon). The analyzer module 207, in connection with the user interface module 205, can also be used to process the one or more requests for media based on a grouping, a categorization, or a combination thereof of the one or more requests. For example, the analyzer module 207 may determine to combine one or more requests for media related to the Great Wall of China and one or more requests for media related to the tourists visiting the Great Wall of China into one request for media. In this instance, the analyzer module 207, in connection with the user interface module 205, presents the one or more sharing users with one request for media that will in fact response to at least two different requests for media. In one embodiment, the analyzer module 207 can determine, based on user profile information, whether one or more sharing users is proficient in capturing a particular type of media (e.g., landscape). In another example, the analyzer module 207 can determine to re-distribute one or more requests for media among a group of one or more sharing users, if for example, one or more sharing users have already received a large number of requests for media. The analyzer module 207 can further be used to determine one or more social relationships among the one or more sharing users and the one or more requesting users based on information within the user profiles of the one or more sharing users and the one or more requesting users. Based on this information, the analyzer module 207 can then prioritize the one or more requests for media. For example, the analyzer module 207 may determine that one request for media originates from the spouse of a sharing user and another request originates from an associate of the sharing user. In this instance, the analyzer module 207 can be used to present the two requests based on a determined priority (e.g., one before the other, graphically differentiated, etc.).

In one embodiment, the analyzer module 207 is also used to determine example media to be presented by the user interface module 205 to one or more sharing users as guidance for capturing the requested media. More specifically, the analyzer module 207 determines the example media based on one or more requests, at least one social networking status of the one or more sharing users, or a combination thereof. The analyzer module 207 can also be used to scan metadata associated with the user profiles of the one or more requesting users (e.g., tags) to determine example media that illustrate recommended viewpoints, frames, one or more subjects, or a combination thereof. In one embodiment, the analyzer module 207 can further be used to scan metadata associated with example media found within one or more social networking services and/or the Internet.

The context module 209 may determine the geographic or temporal context situation of a UE 101 by utilizing location-based technologies (e.g., global positioning system (GPS) receivers, cellular triangulation, assisted-GPS (A-GPS), etc.) to determine location (e.g., geographic coordinates) and/or temporal information (e.g., time of day) regarding a UE 101.

More specifically, the context module 209, in connection with the user interface module 205 and the analyzer module 207, can determine to indicate one or more requests for media to one or more sharing users related to the at least one social networking status of the one or more sharing users (i.e., while the at least one social networking status is active and/or current). The context module 209, in connection with the analyzer module 207, can also be used to determine example media to present to one or more sharing users as guidance for capturing the requested module. In one embodiment, the context module 209 can be used in connection with the communication module 203 and the analyzer module 207 to cause a distribution of the one or more requests for media among the one or more sharing users based on context information associated with the one or more sharing users. By way of example, if a social networking group (e.g., a High School Band) shares a group social networking status (e.g., "@ the Great Wall of China for 30 minutes") as a whole or if only one member of a group posts an individual social networking status, but the analyzer module 207 determines, based on user profile information, that the member is traveling with a group, the context module 209 can determine which member of the group is best able to capture the requested media (e.g., closest to the subject matter).

The storage module 211 can be used to temporarily store example media determined by the analyzer module 207 and/or the context module 209 from one or more social networking services, one or more user profiles associated with one or more requesting users, the Internet, or a combination thereof.

Figure 4:
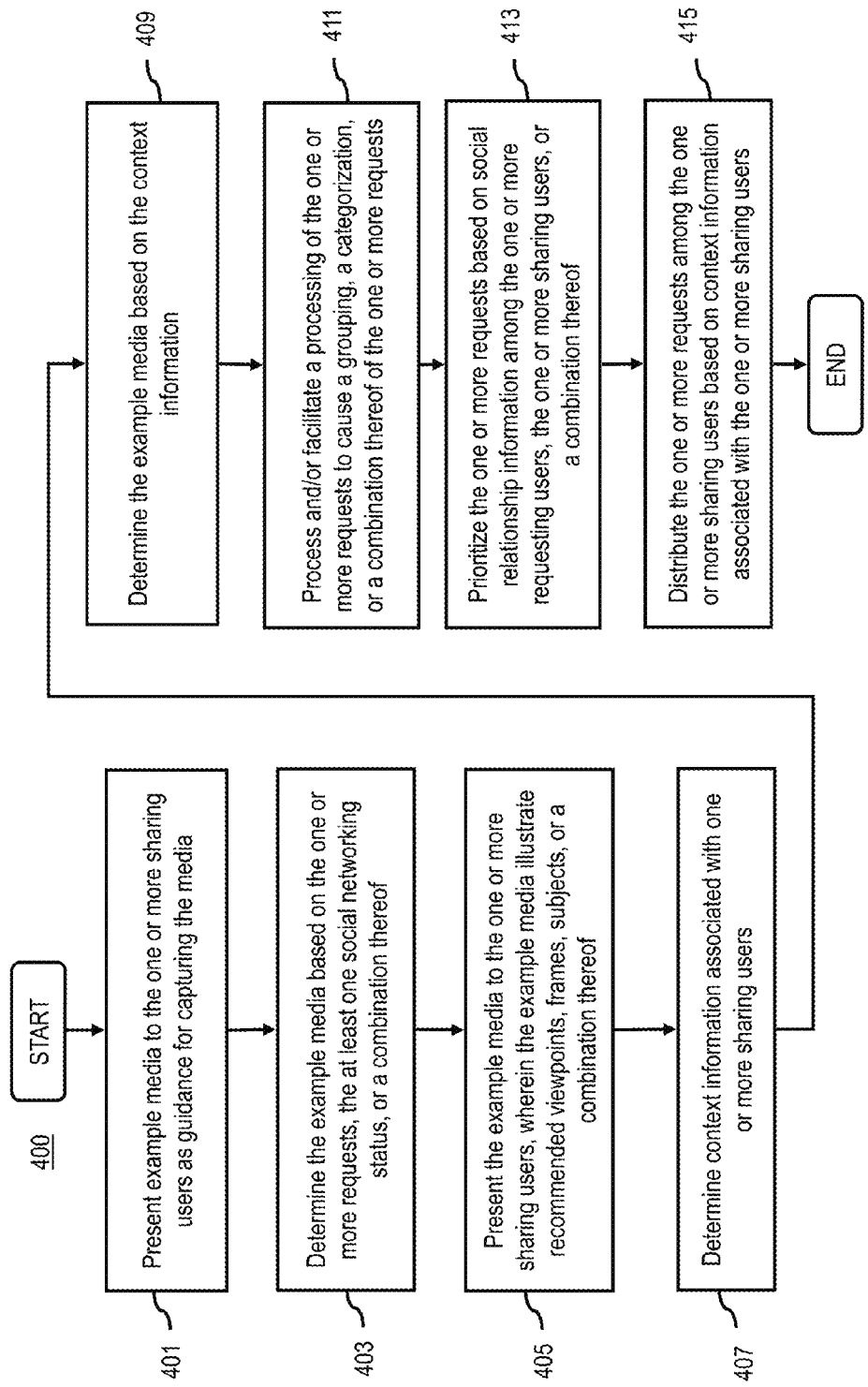
Figure 7:
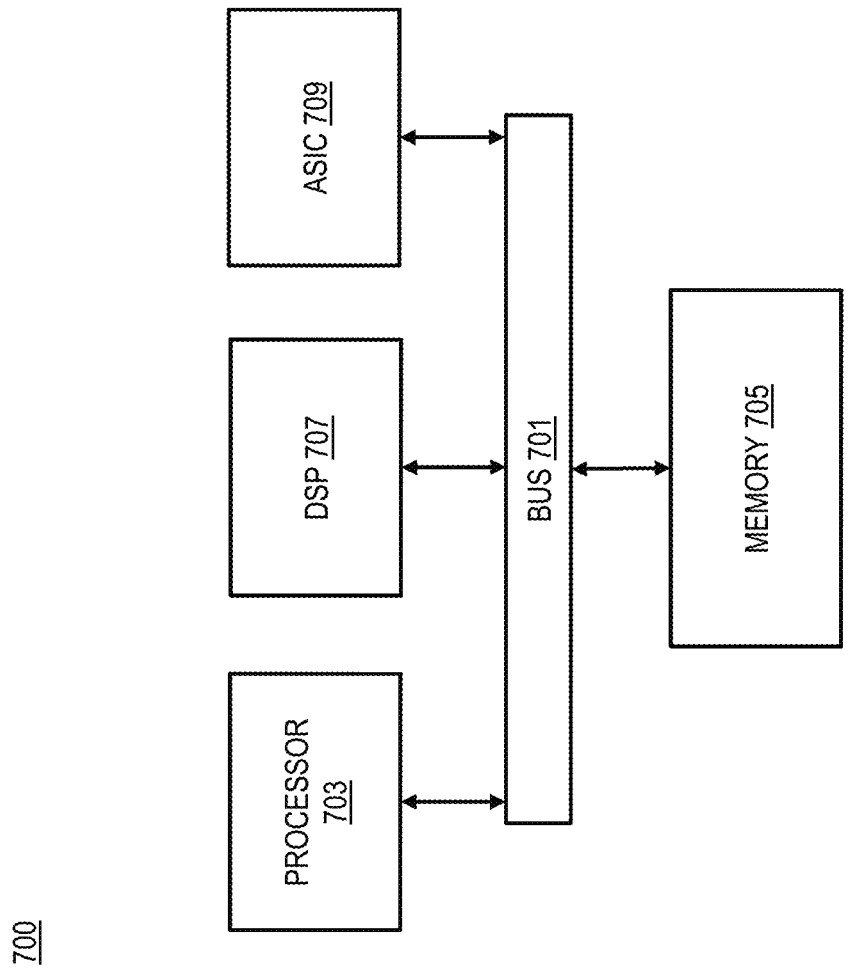
FIG. 7 is a diagram of a chip set that can be used to implement an embodiment of the invention.

FIGS. 3 and 4 are flowcharts of processes for determining requests for media and responding in substantially real-time utilizing a single user interface, according to one embodiment. FIG. 3 depicts a process 300 of determining requests for media and responding in substantially real-time utilizing a single user interface. In one embodiment, the social network client 103 performs the process 300 and is implemented in, for instance, a chip set including a processor and a memory as shown in FIG. 7. In step 301, the social network client 103 determines one or more requests from one or more requesting users to capture media related to at least one social networking status of one or more sharing users. By way of example, as previously discussed, the social network client 103 in a mobile device (e.g., a mobile phone) can be used to determine one or more explicit requests (e.g., "take a picture") and/or one or more implicit requests (e.g., utilizing a "Take photo" icon) related to at least one social networking status (e.g., "@ the Great Wall of China for 30 minutes") of one or more sharing users. In one example, the social network client 103 can share the same at least one social networking status (e.g. "@ the Great Wall of China for 30 minutes") among one or more social networking services (e.g., FACEBOOK, TWITTER, etc.).

In step 303, the social network client 103 causes, at least in part, an indication of the one or more requests to the one or more sharing users related to the at least one social networking status. By way of example, the social network client 103 can determine to withhold the presentation of one or more requests for media to one or more sharing users when the at least one social networking status associated with the one or more sharing users is no longer active and/or current.

In step 305, the social network client 103 determines one or more requests from one requesting users to capture media related to at least one social networking status, wherein the at least one social networking status relates, at least in part, to a location of the one or more sharing users. By way of example, the at least one social networking status can relate to a subject matter comprising a specific iconic location (e.g., "@ the Great Wall of China for 30 minutes" or "@ Times Square") or a general location (e.g., "@ Beijing" or "@ New York City"). In either instance, the location is likely a location that one or more requesting users have previously visited and/or are interested to know what the location looks like.

In step 307, the social network client 103 determines one or more requests from one or more requesting users to capture media, wherein the media includes, at least in part, one or more images, one or more videos, or a combination thereof. By way of example, one or more sharing users can respond to the one or more requests for media by capturing a single photograph of a subject matter with a mobile device (e.g., a mobile phone) and then sharing the photograph with all of the one or more requesting users or the one or more sharing users can capture multiple photographs to share with each of the one or more requesting users, respectively.

Figure 5:
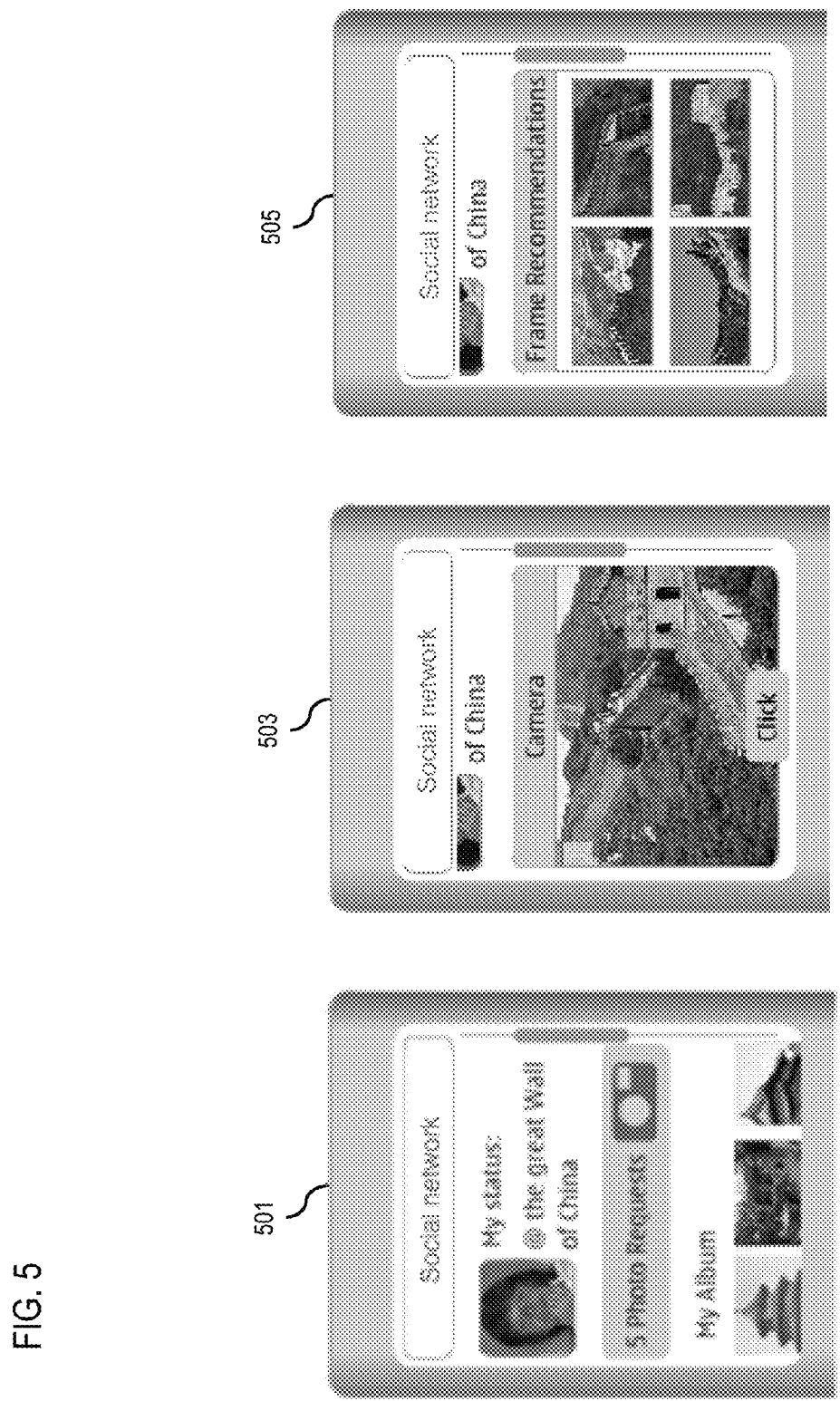
FIG. 5 is a diagram of a user interface utilized in the processes of FIGS. 3 and 4, according to various embodiments.

In step 309, the social network client 103 causes, at least in part, a rendering of the one or more requests, the at least one social networking status, or a combination thereof in a user interface that includes, at least in part, one or more control elements for capturing the media. For example, the social network client 103 can render a user interface in a mobile device that includes an icon (e.g., a camera) that activates a media capture application in the user interface and an icon (e.g., "click") to, in fact, capture the requested media. An illustrative example of this user interface is depicted in FIG. 5.

In step 311, the social network client 103 causes, at least in part, a rendering of one or more other control elements for sharing the media with the one or more requesting users. By way of example, the one or more other control elements in the user interface of a mobile device could include an icon (e.g., an envelope) for sharing the requested media. Again, by rendering the one or more elements for requesting, capturing, and/or sharing media in the same user interface, the social network client 103 enables users to request, capture, and/or share media without having to switch back and forth between one or more applications.

In step 313, the social network client 103 causes, at least in part, a rendering of a user interface element for causing, at least in part, an initiation of the one or more requests, wherein the rendering of the user interface element is in a user interface that presents the at least one social networking status. By way of example, the social network client 103 can render a user interface element (e.g., a "Take photo" icon) in the user interface of a mobile device along with at least one social networking status (e.g., "@ the Great Wall of China for 30 minutes") of one or more sharing users connected with one or more requesting users via one or more social networking services so that the one or more requesting users can request media from the one or more sharing users without having to switch back and forth between different applications.

In step 315, the social network client 103 causes, at least in part, a parsing of one or more comments submitted in response to the at least one social networking status to determine the one or more requests. By way of example, the social network client 103 can determine one or more explicit requests (e.g., "take a picture") and/or one or more implicit requests (e.g., utilizing a "Take photo" icon) to determine the one or more requests for media. In one embodiment, the social network client 103 can render both the explicit and implicit requests together in a single user interface element (e.g., "5 photo requests" and a camera icon). An illustrative example of this presentation is depicted in FIG. 5.

In step 317, the social network client 103 causes, at least in part, a determination of one or more sharing destinations, one or more credentials for the one or more sharing destinations, or a combination thereof. By way of example, the one or more sharing destinations can include one or more social networking services (e.g., FACEBOOK, TWITTER, etc.) and the one or more credentials for the one or more sharing destinations can include login and password information for accessing one or more user profiles on the one or more social networking services. In one embodiment, the social network client 103 can determine the one or more sharing destinations, the one or more credentials for the one or more sharing destinations, or a combination thereof from one or more user preferences stored within a mobile device (e.g., a mobile phone). In another example, the social network client 103 can prompt one or more sharing users to manually enter the one or more sharing destinations, the one or more credentials for the one or more sharing destinations, or a combination thereof using a user interface of the mobile device.

In step 319, the social network client 103 causes, at least in part, a sharing of the media based, at least in part, on the determination. As previously discussed, the social network client 103 can share the requested media in substantially real-time with one or more sharing destinations (e.g., FACEBOOK, TWITTER, etc.) based on the initial determination by the social network client 103 of one or more sharing destinations, one or more credentials for the one or more sharing destinations, or a combination thereof.

FIG. 4 depicts a process 400 for generating at least one or more additional embodiments of the process 300 of determining requests for media and responding in substantially real-time utilizing a single user interface. In one embodiment, the social network client 103 performs the process 400 and is implemented in, for instance, a chip set including a processor and a memory as shown in FIG. 7. In step 401, the social network client 103 causes, at least in part, a presentation of example media to the one or more sharing users as guidance for capturing the media. By way of example, when one or more sharing users are situated in an unfamiliar location, the one or more sharing users may be uncertain as to how to best capture a subject matter (e.g., the Great Wall of China). In contrast, one or more of requesting users, one or more friends, family, and/or associates connected with the one or more sharing users via one or more social networking services, the public at large, or a combination thereof may have already captured media (e.g., photographs and/or videos) of the location that the social network client 103 can present to the one or more sharing users as guidance for capturing the requested media. In addition, the social network client 103 can present to the one or more sharing users the example media in a user interface that includes at least one social networking status and one or more control elements for requesting, capturing, and/or sharing media. An illustrative example of this presentation is depicted in FIG. 5.

In step 403, the social network client 103 determines the example media based, at least in part, on the one or more requests, the at least one social networking status, or a combination thereof. For example, the social network client 103 can determine example media based on an explicit request for media (e.g., "Take a picture of the Great Wall of China") or on an implicit request (e.g., utilizing a "Take photo" icon) related to one or more sharing users sharing at least one social networking status (e.g., "@ the Great Wall of China for 30 minutes"). More specifically, the social network client 103 can compare the explicit and/or implicit requests, the at least one social networking status, or a combination thereof against metadata associated with media captured by one or more requesting users, friends, family, and/or associates connected with the one or more sharing users via one or more social networking services, the public at large, or a combination thereof. In one embodiment, the social network client 103 can also determine example media of a similar place (e.g., a different iconic cathedral) when the social network client 103 determines that example media of a location and/or subject matter is unavailable from the one or more requesting users, the friends, family, and/or associates connected with the one or more sharing users via one or more social networking services, the public at large, or a combination thereof.

In step 405, the social network client 103 causes, at least in part, a presentation of example media, wherein the example media illustrate, at least in part, recommended viewpoint information, recommended framing information, one or more recommended subjects, or a combination thereof. As previously discussed, the example media determined and presented by the social network client 103 is intended to provide the one or more sharing users with guidance as to how to best capture media related to a location, a subject matter, or a combination thereof.

In step 407, the social network client 103 determines context information associated with one or more sharing users. By way of example, a mobile device (e.g., a mobile phone) utilized by one or more sharing users may contain location-based technologies (e.g., GPS receivers, cellular triangulation, A-GPS, etc.) that can enable the social network client 103 to determine both the location (e.g., geographic coordinates) and the temporal information (e.g., time of day) associated with the mobile device.

In step 409, the social network client 103 determines the example media based, at least in part, on the context information. For example, the social network client 103 can first determine that one or more sharing users are at a certain location (e.g., the Eiffel Tower) and then the social network client 103 can determine the time of the day (e.g., 9:00 p.m.). As a result, the social network client 103 can determine example media (e.g., a photograph of the Eiffel Tower at night) that will be more helpful than other example media (e.g., the Eiffel Tower during the day) to provide the one or more sharing users with guidance as to how to best capture the requested media.

In step 411, the social network client 103 processes and/or facilitates a processing of the one or more requests to cause, at least in part, a grouping, a categorization, or a combination thereof of the one or more requests, wherein the presentation of the one or more requests are based, at least in part, on the grouping, the categorization, or a combination thereof. By way of example, the social network client 103 can process and combine one or more requests for media related to the Great Wall of China and one or more requests for media related to tourists visiting the Great Wall of China into a single request that can be fulfilled by one or more sharing users with a single media (e.g., a photograph of tourists on the Great Wall of China).

In step 413, the social network client 103 causes, at least in part, a prioritization of the one or more requests based, at least in part, on social relationship information among the one or more requesting users, the one or more sharing users, or a combination thereof. By way of example, the social network client 103 can determine, based on the user profiles of the one or more sharing users and the one or more requesting users, that one request for media is from the spouse of the sharing user and another request is from a colleague of the sharing user. The social network client 103 can then assign priority to the request for media from the sharing user's spouse (e.g., presenting this request first, graphically differentiating, etc.) so that media requested by the sharing user's spouse is captured and shared before and/or instead of the media requested by the sharing user's colleague.

In step 415, the social network client 103 causes, at least in part, a distribution of the one or more requests among the one or more sharing users based, at least in part, on context information associated with the one or more sharing users. By way of example, if a social networking group (e.g., a High School Band) shares a group social networking status (e.g., "@ the Great Wall of China for 30 minutes") as a whole or if only one member of a group posts an individual social networking status, but the social network client 103 can determine from his or her user profile information that the member is traveling with a group, the social network client 103 can determine which member of the group is best able to capture the requested media (e.g., closest to the subject matter). In one example, the social network client 103 can also determine to re-distribute one or more requests for media among the group if, for example, one or more sharing users have already received a large number of requests for media. In another example, the social network client 103 can determine from a user profile of the one or more sharing users that a particular user is proficient at capturing media in a specific manner (e.g., landscape). The social network client 103 can then assign one or more requests for landscape media to that particular sharing user within the group.

FIG. 5 is a diagram of a user interface utilized in the processes of FIGS. 3 and 4, according to various embodiments. As shown, the example user interface of FIG. 5 includes one or more user interface elements and/or functionalities created and/or modified based, at least in part, on information, data, and/or signals resulting from the processes (e.g., processes 300 and 400) described with respect to FIGS. 3 and 4. More specifically, FIG. 5 illustrates three different forms of a single user interface (e.g., interfaces 501, 503, and 505) utilized for determining one or more requests for media, capturing media responsive to the one or more requests, and determining example media, respectively. As shown in interface 501, a sharing user has shared at least one social networking status (e.g., "@ the Great Wall of China for 30 minutes") with one or more friends, family, and/or associates that the sharing user is connected with via one or more social networking services (e.g., FACEBOOK). As a result, one or more of the sharing user's friends, family, and/or associates have requested media (e.g., "Take a photo of the Great Wall") related to the at least one social networking status of the sharing user (also collectively referred to as requesting users). By way of example, the sharing user can select the camera icon as shown in interface 501 in order to activate an application in the user interface for capturing media. As shown in interface 503, the sharing user can then select the "click" icon to seamlessly capture the requested media (e.g., the Great Wall of China) in the same user interface. In addition, the same user interface can be utilized (e.g., by using a scroll bar element and an envelope icon (not shown for illustrative purposes)) to share the media with the one or more requesting users, the one or more social networking services, or a combination thereof. Moreover, where one or more sharing users is uncertain as to how to best capture the requested media, the one or more sharing users can further manipulate the user interface (e.g., by using the scroll bar element) to determine example media related to the requested media as shown in interface 505.

The processes described herein for determining requests for media and responding in substantially real-time utilizing a single user interface may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
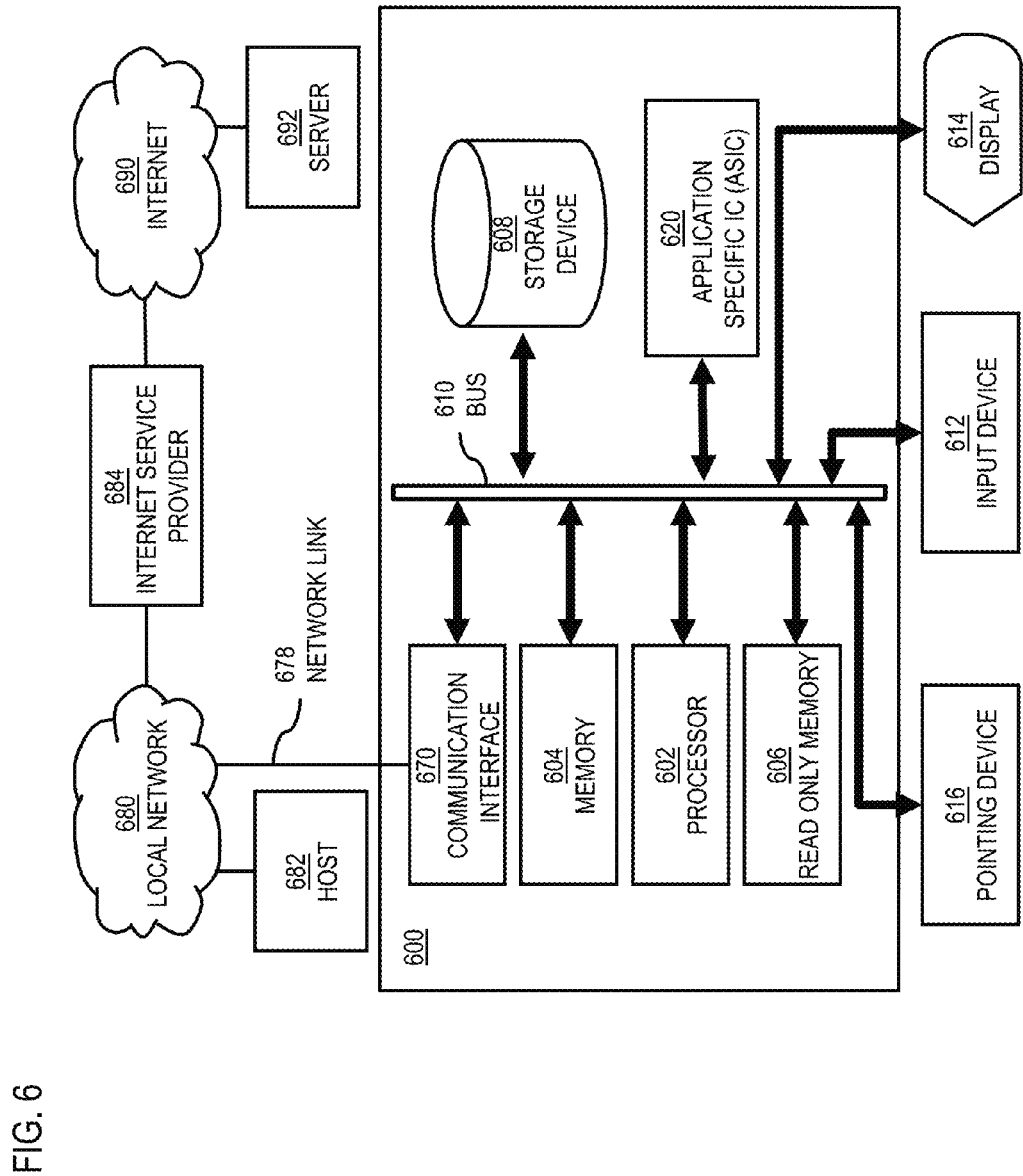
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to determine requests for media and responding in substantially real-time utilizing a single user interface as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of determining requests for media and responding in substantially real-time utilizing a single user interface.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to determine requests for media and responding in substantially real-time utilizing a single user interface. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for determining requests for media and responding in substantially real-time utilizing a single user interface. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for determining requests for media and responding in substantially real-time utilizing a single user interface, is provided to the bus 610 for use by the processor from an external input device 612, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for determining requests for media and responding in substantially real-time utilizing a single user interface to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to determine requests for media and responding in substantially real-time utilizing a single user interface as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of determining requests for media and responding in substantially real-time utilizing a single user interface.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to determine requests for media and responding in substantially real-time utilizing a single user interface. The memory 705 also stores the data associated with or generated by the execution of the inventive steps.

Figure 8:
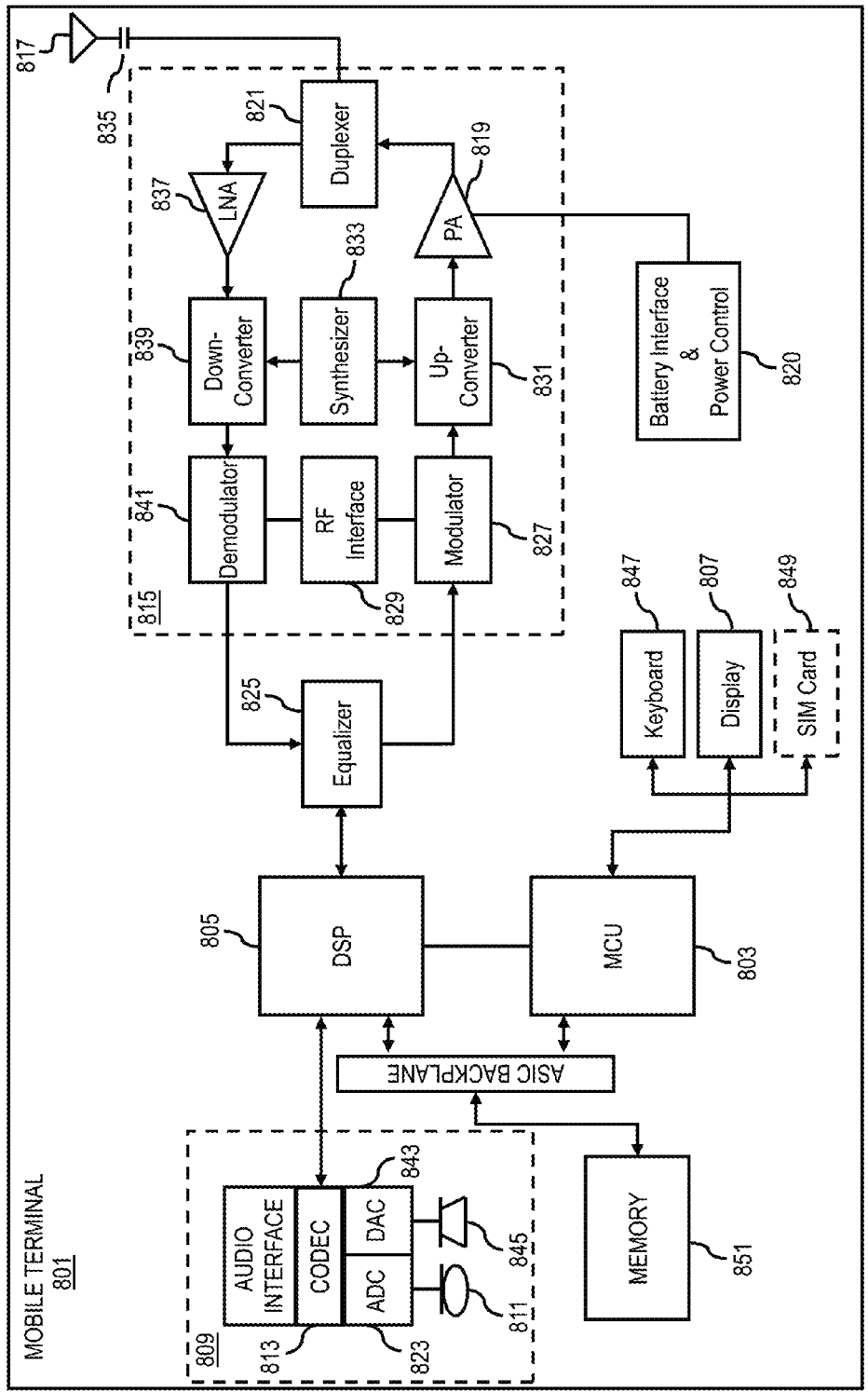
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of determining requests for media and responding in substantially real-time utilizing a single user interface. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of determining requests for media and responding in substantially real-time utilizing a single user interface. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to determine requests for media and responding in substantially real-time utilizing a single user interface. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
    at least one determination of one or more requests initiated via a user interface from one or more requesting users to capture media related to at least one social networking status of one or more sharing users using at least one processor, wherein the user interface is further used to specify the at least one social networking status;
    an indication of the one or more requests to the one or more sharing users related to the at least one social networking status; and
    a presentation of example media to the one or more sharing users as guidance for capturing the media,
    wherein the example media illustrate, at least in part, recommended viewpoint information, recommended framing information, one or more recommended subjects, or a combination thereof.

2. A method of claim 1, wherein the at least one social networking status relates, at least in part, to a location of the one or more sharing users and the at least one determination of one or more requests is limited to a predetermined period of time.

3. A method of claim 1, wherein the media includes, at least in part, one or more images, one or more videos, or a combination thereof.

4. A method of claim 1, wherein the (1) data and/or (2) information and/or (3) at least one signal are further based, at least in part, on the following:
    a rendering of the one or more requests, the at least one social networking status, or a combination thereof in the single user interface that also includes, at least in part, one or more control elements for capturing the media.

5. A method of claim 4, wherein the (1) data and/or (2) information and/or (3) at least one signal are further based, at least in part, on the following:
    a rendering of one or more other control elements for sharing the media with the one or more requesting users.

6. A method of claim 1, wherein the (1) data and/or (2) information and/or (3) at least one signal are further based, at least in part, on the following:
    at least one determination of the example media based, at least in part, on the one or more requests, the at least one social networking status, or a combination thereof.

7. A method of claim 1, wherein the (1) data and/or (2) information and/or (3) at least one signal are further based, at least in part, on the following:
    at least one determination of context information associated with one or more sharing users; and
    at least one determination of the example media based, at least in part, on the context information.

8. A method of claim 1, wherein the (1) data and/or (2) information and/or (3) at least one signal are further based, at least in part, on the following:
    a processing of the one or more requests to cause, at least in part, a grouping, a categorization, or a combination thereof of the one or more requests,
    wherein the presentation of the one or more requests are based, at least in part, on the grouping, the categorization, or a combination thereof.

9. A method of claim 1, wherein the (1) data and/or (2) information and/or (3) at least one signal are further based, at least in part, on the following:
    a prioritization of the one or more requests based, at least in part, on social relationship information among the one or more requesting users, the one or more sharing users, or a combination thereof.

10. A method of claim 1, wherein the (1) data and/or (2) information and/or (3) at least one signal are further based, at least in part, on the following:
    a distribution of the one or more requests among the one or more sharing users based, at least in part, on context information associated with the one or more sharing users.

11. A method of claim 1, wherein the (1) data and/or (2) information and/or (3) at least one signal are further based, at least in part, on the following:
    a rendering of a user interface element for causing, at least in part, the initiation of the one or more requests,
    wherein the rendering of the user interface element is in the user interface that also presents the at least one social networking status.

12. A method of claim 1, wherein the (1) data and/or (2) information and/or (3) at least one signal are further based, at least in part, on the following:
    a parsing of one or more comments submitted in response to the at least one social networking status to determine the one or more requests.

13. A method of claim 1, wherein the (1) data and/or (2) information and/or (3) at least one signal are further based, at least in part, on the following:
    a determination of one or more sharing destinations, one or more credentials for the one or more sharing destinations, or a combination thereof; and
    a sharing of the media based, at least in part, on the determination.

14. An apparatus comprising:
    at least one processor; and
    at least one memory including computer program code for one or more programs,
    the at least one memory and the computer program code configured to, with the at least one processor, cause the apparatus to perform at least the following,
    determine one or more requests initiated via a user interface from one or more requesting users to capture media related to at least one social networking status of one or more sharing users using at least one processor, wherein the user interface is further used to specify the at least one social networking status;

cause, at least in part, an indication of the one or more requests to the one or more sharing users related to the at least one social networking status: and present example media to the one or more sharing users as guidance for capturing the media;

wherein the example media illustrate, at least in part, recommended viewpoint information, recommended framing information, one or more recommended subjects, or a combination thereof.

15. An apparatus of claim 14, wherein the at least one social networking status relates, at least in part, to a location of the one or more sharing users and the at least one determination of one or more requests is limited to a predetermined period of time.

16. An apparatus of claim 14, wherein the apparatus is further caused to:

cause, at least in part, a rendering of the one or more requests, the at least one social networking status, or a combination thereof in the user interface that also includes, at least in part, one or more control elements for capturing the media.

17. A computer program product comprising a non-transitory computer readable storage medium including one or more sequences of one or more instructions which, when executed by one or more processors, cause an apparatus to at least perform the steps of:

determining one or more requests initiated via a user interface from one or more requesting users to capture media related to at least one social networking status of one or more sharing users using at least one processor, wherein the user interface is further used to specify the at least one social networking status;

causing, at least in part, an indication of the one or more requests to the one or more sharing users related to the at least one social networking status; and presenting example media to the one or more sharing users as guidance for capturing the media.

wherein the example media illustrate, at least in part, recommended viewpoint information, recommended framing information, one or more recommended subjects, or a combination thereof.

18. A computer program product of claim 17, wherein the apparatus is further caused to perform:

causing, at least in part, a rendering of the one or more requests, the at least one social networking status, or a combination thereof in the single user interface that also includes, at least in part, one or more control elements for capturing the media.

* * * * *